United States Patent
Salim et al.

(10) Patent No.: US 6,320,283 B1
(45) Date of Patent: Nov. 20, 2001

(54) POWER ACTUATION AND SWITCHING MODULE

(75) Inventors: Abbas A. Salim, Fremont, CA (US); James W. Jud, Lambertville; James F. Mulvey, Flemington, both of NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/393,182

(22) Filed: Sep. 10, 1999

(51) Int. Cl.$^7$ ........................................... H02H 3/00
(52) U.S. Cl. ..................... 307/125; 307/130; 307/131; 361/93.1; 361/100; 361/115
(58) Field of Search ............................. 307/31, 35, 113, 307/116, 125, 130, 131; 361/2, 7, 90, 93.1, 100, 115

(56) References Cited

U.S. PATENT DOCUMENTS 5,063,516 * 11/1991 Jamoua et al. .................. 364/431.11
5,324,989 * 6/1994 Thornton ............................... 307/35

OTHER PUBLICATIONS

"Switch Intelligently With SSPC's" Circle 217, Sales Contact, Circle 277 Literature, PCIM, Oct. 1995, 1 pps.
"RP–2100 Series, 28 VDC Solid–State Power Controllers", ILC Data Device Corporation, 1995, 1 pps.
Mulvey et al. "Development of a State–of–the–Art Power Actuation and Switching Modulation" IEEE International Workshop, Chicago, IL, Sep. 17–19, 1998, 5 pps.
Salim et al. "PASM, The Advanced Power Actuation and Switching Module As The Building Block For Space Micropower Systems" Mar. 8–11, 1999, 5 pps.
"Remote Power Controllers (Solid State)" Martin Marietta, 2 pps.

\* cited by examiner

*Primary Examiner*—Josie Ballato
*Assistant Examiner*—Robert L. DeBeradinis
(74) *Attorney, Agent, or Firm*—Swidler Berlin Shereff Friedman, LLP (57) ABSTRACT

An advanced power switching apparatus that is suitable for use in spacecraft and provides miniaturization, weight reduction, and improved reliability of power switching and protection functions. The apparatus provides greatly increased functionality, and is capable of switching power, isolating faults, and limiting in-rush and fault currents. The apparatus comprises a plurality of power switching circuits. Each power switching circuit comprises a switched power input and a switched power output, a switching device coupling the switched power input to the switched power output, the switching device having a control input, and an integrated circuit coupled to the switching device control input, having an enable input receiving a signal indicating whether the switching device is to be on or off, an input sensing current flow through the switching device, and an input sensing voltage at the switched power output, the circuit operable to control the switching device based on the control input, current sensing input and voltage sensing input.

35 Claims, 11 Drawing Sheets

802
CHARACTERISE
COMPONENTS →

804
MACHINE
SUBSTRATE →

Fig. 9

806
METALLIZE
SUBSTRATE

808
ATTACH
COMPONENTS

Fig. 10

810
FABRICATE
INTERCONNECT
LAYER →

812
ATTACH
SURFACE
MOUNT
COMPONENTS →

Fig. 11

POWER ACTUATION AND SWITCHING MODULE

FIELD OF THE INVENTION

The present invention relates to a power switching apparatus capable of switching power, isolating faults, and limiting in-rush and fault currents.

BACKGROUND OF THE INVENTION

Spacecraft, such as those used for earth orbit and interplanetary space missions, must be designed within the limits of a number of constraints. Two important constraints are the weight and size of components used in the spacecraft. In addition to such constraints, spacecraft must be designed to perform specified functions within specified parameters. Among these are power load switching and power protection functions of various electrical and electronic subsystems of the spacecraft. Finally, reliability is always an overriding concern in the design of spacecraft.

Traditionally, load switching and protection functions were implemented with relays and fuses. These devices tend to be relatively large and heavy. They are capable of performing only the most basic of power load switching and protection functions. Relays provide only on-off switching and fuses provide only one-time protection, which is not resettable. The reliability of these devices is adequate, but improved reliability is always desirable.

A need arises for a power switching and protection device that provides reduced size and weight, improved functionality, and improved reliability over traditional devices.

SUMMARY OF THE INVENTION

The present invention is an advanced power actuation and switching module (PASM) that is suitable for use in spacecraft. PASM provides tremendous miniaturization and weight reduction of power switching and protection functions over traditional devices. PASM provides greatly increased functionality, and is capable of switching power, isolating faults, and limiting in-rush and fault currents. PASM is implemented using integrated circuit and high density interconnect technologies, providing improved reliability.

The present invention is a power switching apparatus comprising a plurality of power switching circuits. Each power switching circuit comprises a switched power input and a switched power output, a switching device coupling the switched power input to the switched power output, the switching device having a control input, and an integrated circuit coupled to the switching device control input, having an enable input receiving a signal indicating whether the switching device is to be on or off, an input sensing current flow through the switching device, and an input sensing voltage at the switched power output, the circuit operable to control the switching device based on the control input, current sensing input and voltage sensing input.

In one embodiment, the integrated circuit comprises a power on circuit, responsive to the enable input receiving a signal indicating that the switching device is to be on, operable to transmit an enable signal, a sense amplifier circuit, coupled to the current sense input, operable to output a signal indicating current flow through the switching device, an overload circuit, coupled to the current flow indicating signal, operable to output an overload signal indicating that the current flow through the switching device has exceeded a predetermined limit, a current limit circuit, coupled to the current flow indicating signal, operable to output a gate drive current limit signal, a control circuit, responsive to the enable signal and the overload signal operable to transmit a charge pump bias signal and a gate drive control signal, a charge pump circuit, responsive to the charge pump bias signal, operable to output a gate drive bias signal and a gate drive circuit, responsive to the gate drive bias signal, the gate drive control signal, and the gate drive current limit signal, operable to output a switching device control signal coupled to the switching device control input.

In one aspect of the present invention the overload circuit may include a timer circuit operable to delay output of the overload signal.

In another aspect of the present invention, the gate drive circuit may include a circuit operable to limit an inrush current through the switching device during turn on.

In another aspect of the present invention, the power on circuit is further responsive to the enable input receiving a signal that the switching device is to be off and is further operable to transmit a disable signal. The power on circuit may further include a circuit operable to delay output of the disable signal after receiving the signal that the switching device is to be off.

In another aspect, the integrated circuit may further include a voltage telemetry circuit coupled to the input sensing voltage at the switched power output and outputting a signal indicating the sensed voltage on an output of the integrated circuit.

In another aspect, the sense amplifier circuit may further output a signal indicating the sensed current flow on an output of the integrated circuit.

In another aspect, the switching device may be a power field-effect transistor.

In another aspect, the overload circuit timer circuit may include a circuit operable to set a delay time of the output of the overload signal. The circuit operable to set a delay time of the output of the overload signal may be a capacitor external to the integrated circuit.

In another aspect, the gate drive circuit inrush current limit circuit may include a circuit operable to set the inrush current through the switching device. The circuit operable to set the inrush current through the switching device may be a capacitor external to the integrated circuit.

In another aspect, the power on circuit disable output delay circuit may include a circuit operable to set a delay time of the output of the disable signal. The circuit operable to set a delay time of the output of the disable signal may be a capacitor external to the integrated circuit.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
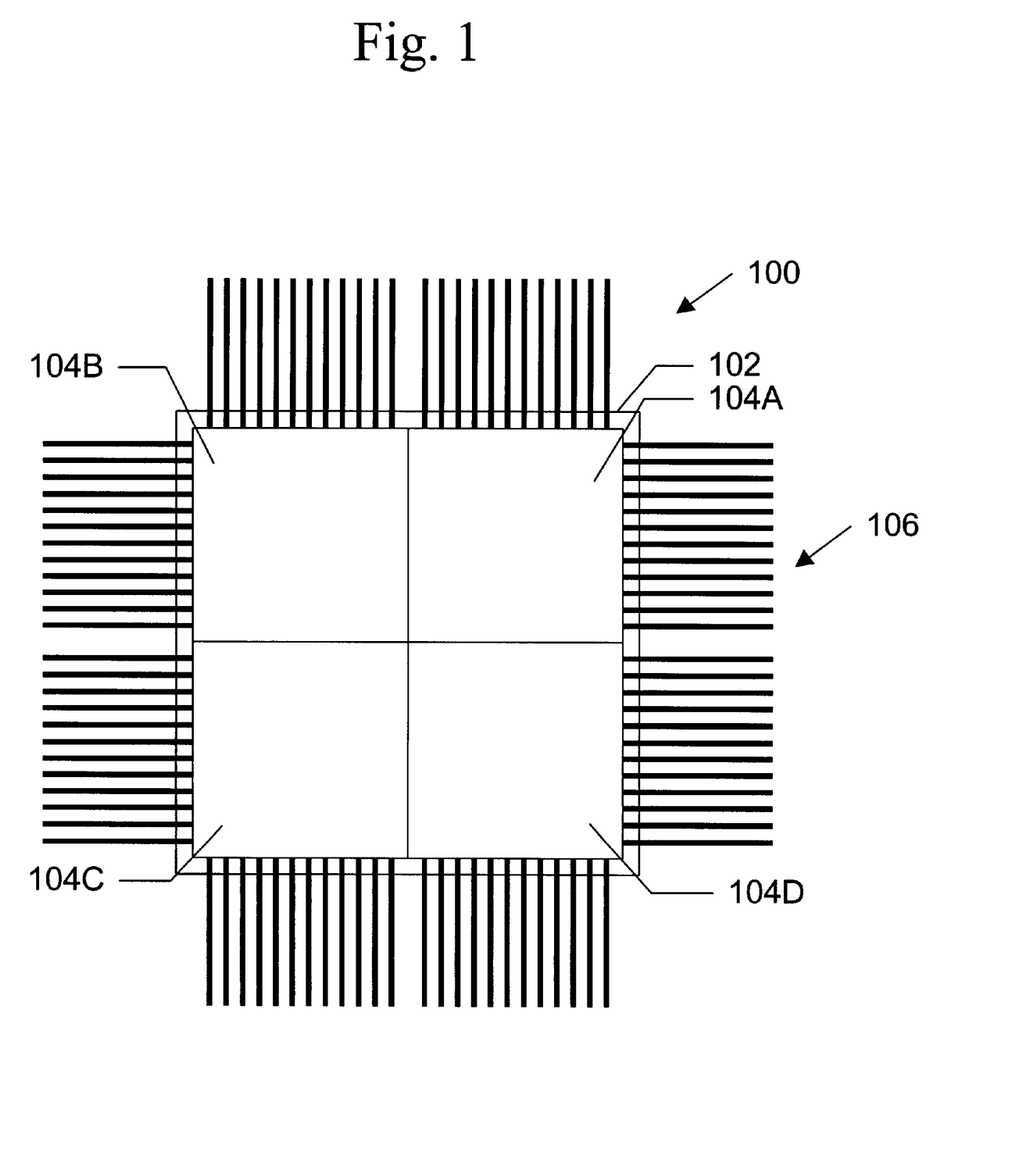
FIG. 1 is a view of a power actuation and switching module, according to the present invention.

One embodiment of a power actuation and switching module 100, according to the present invention, is shown in FIG. 1. Module 100 includes a package 102, which contains preferably four power actuation and switching circuits 104A, 104B, 104C and 104D. Package 102 is preferably approximately 1.5×1.5×0.25 inches in size. A plurality of leads 106 emerge from package 102 and allow the circuitry contained in package 102 to interconnect with circuitry external to module 100.

Figure 2:
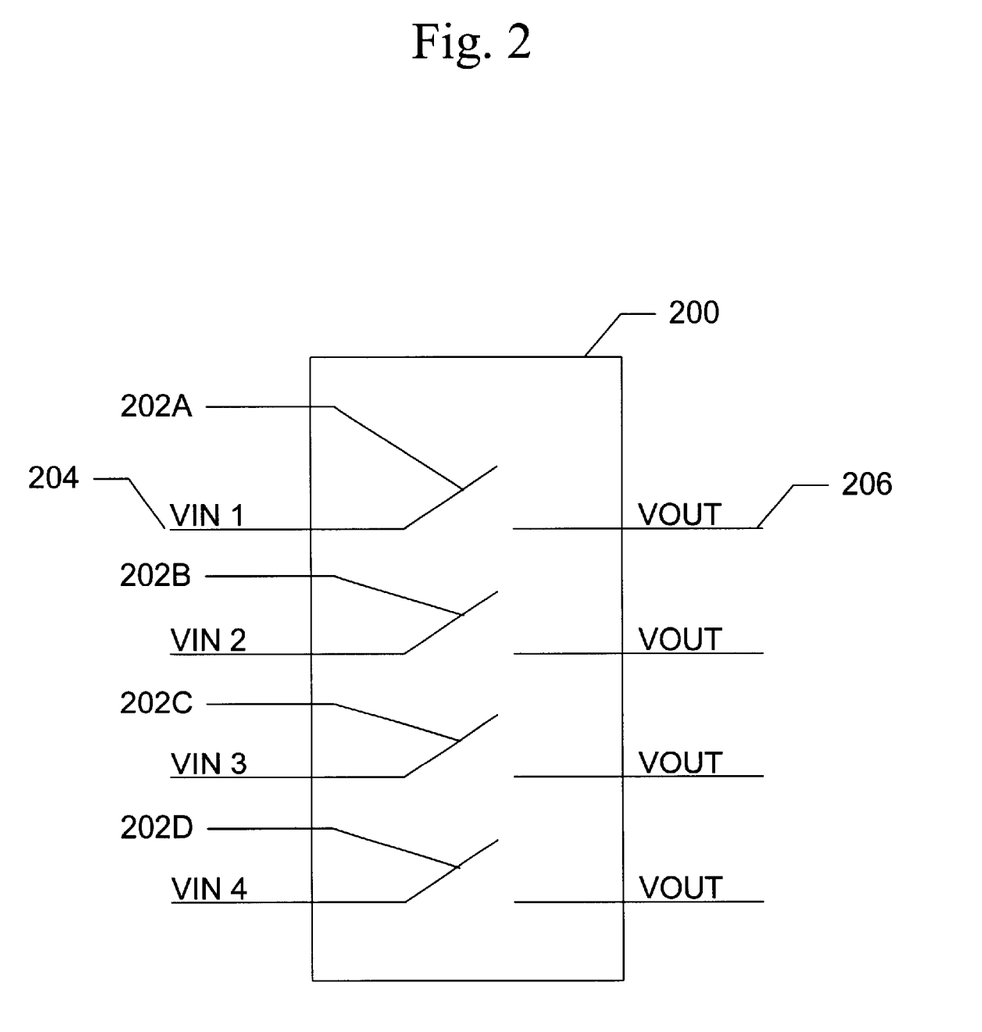
FIG. 2 is an exemplary functional block diagram of the power actuation and switching module of FIG. 1.

A simplified exemplary functional block diagram 200 of the switch configuration of module 100 is shown in FIG. 2. Each power actuation and switching circuit 104A, 104B, 104C, and 104D is represented by a switch 202A, 202B, 202C, and 202D, respectively. Each switch, for example, switch 202A receives a voltage in on switched power input (VIN 1) 204 and selectively switches the voltage to the switched power output (VOUT 1) 206. Likewise, each other switch 202B–D is independently selectable to switch an input voltage to an output connection.

Module 100 includes four independently configurable switches with independent command, telemetry, and housekeeping power lines. The only common node in module 100 is the ground. The switches can be used individually, or can be connected in series or in parallel externally, for power switching. Each switch 104A–D primarily functions as a fault isolation device or a circuit breaker and performs both power switching and fusing functions. Each switch 104A–D provides current controlled turn on (inrush current limiting), fault current limiting, trip time control, and voltage controlled turn off.

Figure 3:
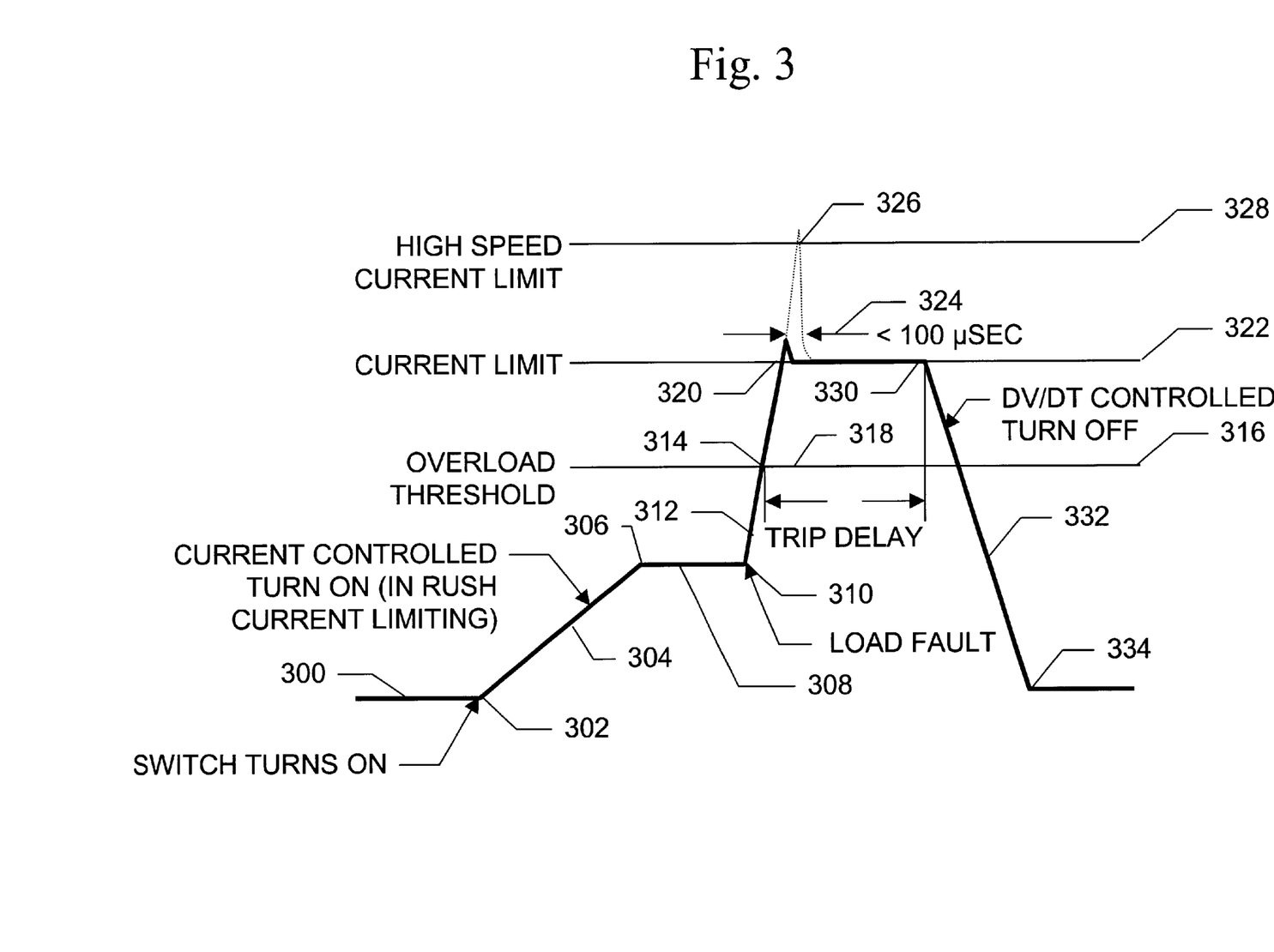
FIG. 3 is a diagram of the current output from a power actuation and switching circuit included in the module of FIG. 1.

A diagram of the current output of a power actuation and switching circuit is shown in FIG. 3. Initially, the circuit output is off 300 and the current output is zero. At point 302, the circuit is commanded to turn on and the current output begins to rise. During current output rise region 304, the output current is di/dt controlled to limit inrush current to the load device. The rate of inrush current limiting is set by selection of an external capacitor. At point 306, the normal load current mode 308 is established and inrush current limiting is discontinued. The normal load current mode 308 allows the load to draw varying load currents without interference from the power actuation and switching circuit.

At point 310, a load fault occurs and load current begins to rise 312. As the power actuation and switching circuit is still in the normal load current mode 308, the load current 312 rises without interference from the power actuation and switching circuit. At point 314, the overload threshold 316 is reached and the trip delay timer 318 starts timing. The trip delay allows short-term load current spikes that happen to exceed the overload threshold 316 to be supplied to the load without interference from the power actuation and switching circuit. Such short-term current spikes may occur in normal operation and are not necessarily indicative of a load fault. However, a long-term current draw that exceeds the overload threshold does indicate a load fault and must be dealt with by the power actuation and switching circuit. The trip delay time is set by selection of an external capacitor.

The load current continues to rise until, at point 320, the current limit 322 is reached. The load current will remain at current limit 322 until expiration of trip delay 318 at point 330, at which time the switching circuit performs a voltage-controlled (dv/dt) shutdown 332 of the load. In the event of a direct load fault to ground, the load current will rise until, at point 326, the high-speed current limit 328 is reached, at which time high-speed current limiting is activated. The load current will then return to the current limit 322 within the high-speed current limit activation time 324, which is preferably less than 100 microseconds. At point 334, the load is completely shut down.

Figure 4:
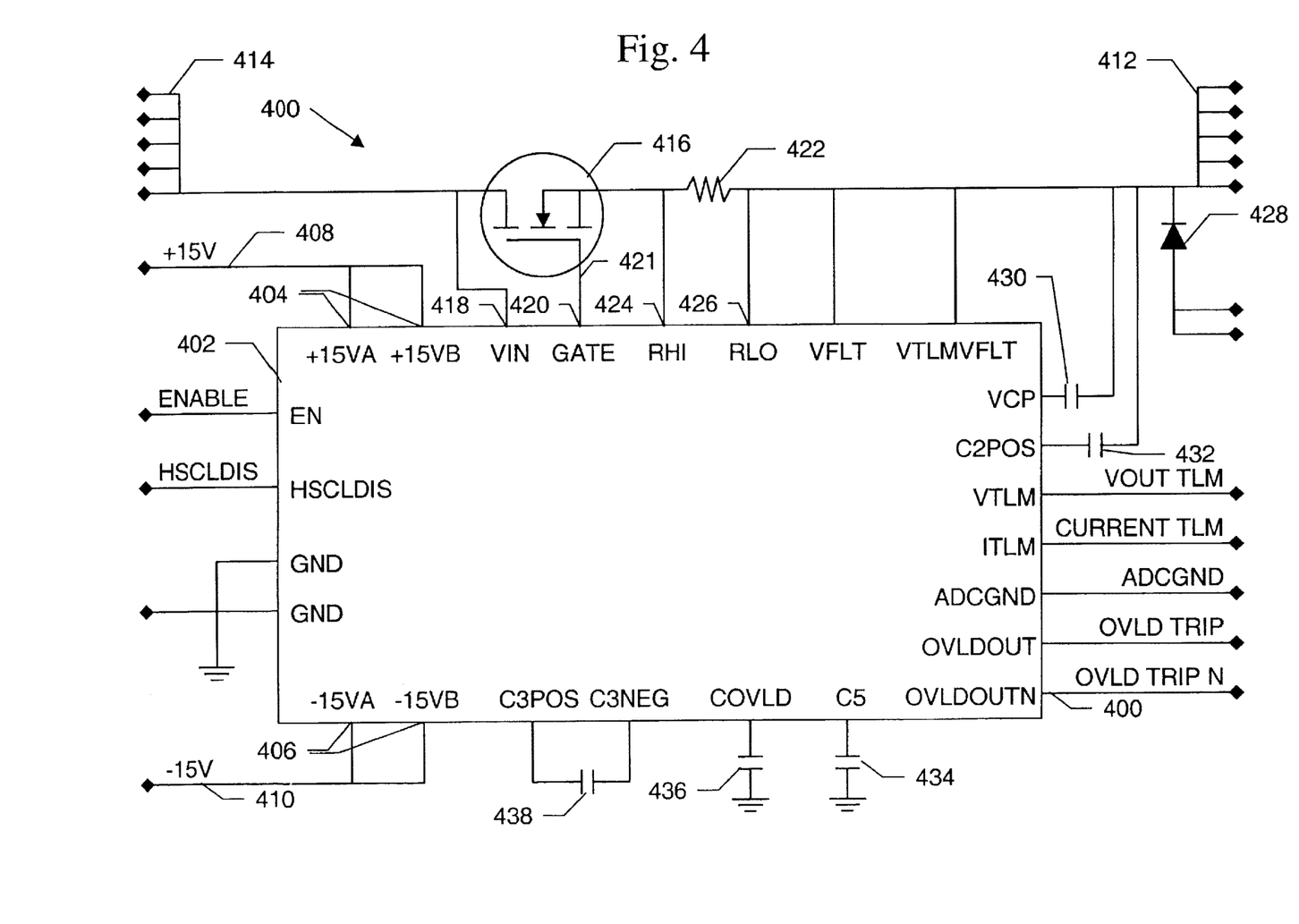
FIG. 4 is an exemplary circuit diagram representing a power actuation and switching circuit included in the module of FIG. 1.

An exemplary circuit 400 representing a power actuation and switching circuit, such as circuit 104A, 104B, 104C or 104D, is shown in FIG. 4. Circuit 400 includes control circuit 402, which provides most of the functionality of circuit 400. Preferably, control circuit 402 is an application-specific integrated circuit. Control circuit 402 includes a number of inputs and outputs. For example, inputs 404 and 406 supply power to control circuit 402 for operation of the internal circuitry. Preferably, inputs 404 are connected to a switching circuit power input 408, preferably at +15 volts, and inputs 406 are connected to switching circuit input 410, preferably at −15 volts.

Power is supplied to the load via switched power output 412 from power actuation and switching circuit 400. The power that is supplied to the load is input to power actuation and switching circuit 400 via switched power input 414. Switched power input 414 and switched power output 412 preferably includes multiple pins, in order to handle the rated current. Switched power input 414 and switched power output 412 are not connected to and are independent of switching circuit power inputs 408 and 410.

Switched power input 414 and switched power output 412 are coupled by a switching device 416, which preferably is a power transistor that is external to control circuit 402. Preferably, the power transistor is a power field-effect transistor. Control circuit 402 senses the input voltage on input 418 and controls power transistor 416 via output 420, which is connected to the control input 421 of switching device 416. Preferably, control input 421 is the gate of the power field-effect transistor. Sense resistor 422 is used, in conjunction with inputs 424 and 426, to sense the load current being supplied. The load current produces a voltage drop across sense resistor 422 and the voltage drop is sensed by inputs 424 and 426. Preferably, sense resistor 422 is 0.02 ohms, 1 watt. Clamp diode 428 prevents voltage spikes from being presented to the load. Preferably, clamp diode 428 has a clamp threshold voltage of 150 volts.

Capacitor 430 is used to filter the output from a charge pump that is included in control circuit 402. The operation of the charge pump is described below. Preferably, capacitor 430 has a value of 47 nano-farads. Capacitor 432 sets the inrush current limit value. Preferably, capacitor 432 has a value of 18 nano-farads, which provides an inrush current limit of approximately 7.5 mili-amps per microsecond. Capacitor 434 sets the delay in the turn-off of the charge pump, as described below. Preferably, capacitor 434 has a value of 10 nano-farads, which provides a charge pump turn-off delay of approximately 18 milliseconds. Capacitor 436 sets the overload trip delay, which is the delay between the overload threshold being exceeded and the switch turning off. Preferably, capacitor 436 has a value of 10 nano-farads, which provides an overload trip delay of approximately 1.3 milliseconds. Capacitor 438 couples the charge pump to provide bias for gate drive and current sense circuitry, as described below. Preferably, capacitor 438 is 18 nano-farads.

Figure 5:
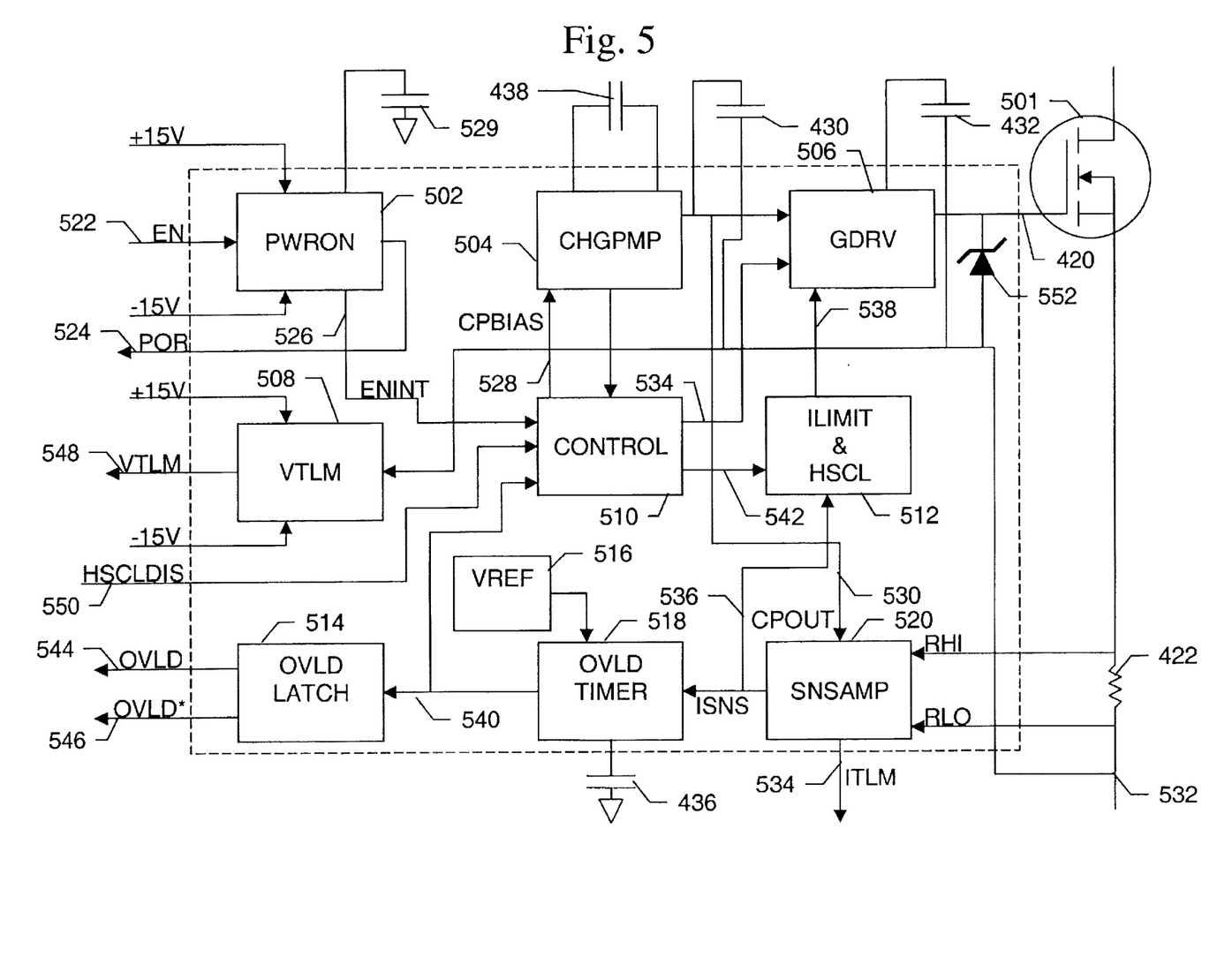
FIG. 5 is a more detailed block diagram of the power actuation and switching circuit shown in FIG. 4.

A more detailed block diagram of power actuation and switching control circuit 402, shown in FIG. 4, and associated circuitry, is shown in FIG. 5. In this embodiment, switching device 416 is a power field-effect transistor 501. Power actuation and switching control circuit 402 includes power on circuit 502, charge pump 504, gate drive circuit 506, voltage telemetry circuit 508, control circuit 510, current limit and high-speed current limit circuit 512, overload latch 514, voltage reference 516, overload timer 518, and sense amplifier and current telemetry circuit 520. Power on circuit 502 receives enable signal 522. When enable signal 522 transitions to indicate that power should turn on, circuit 502 outputs POR signal 524 and enable signal 526. Enable signal 526 is received by control circuit 510, which outputs charge pump bias signal 528. Charge pump bias signal 528 is received by charge pump 504, which activates the charge pump. When enable signal 522 transitions to indicate that power should turn off, capacitor 529 delays the turn off of charge pump 504 to ensure that power transistor 510 is completely off before the charge pump turns off.

Charge pump 504 operates at a frequency of 1 megahertz and provides bias for gate drive circuit 506 and sense circuit 520. Charge pump 504 uses capacitor 438 to generate the output bias voltage 530, which is filtered by capacitor 430. Capacitor 430 is referenced to the switch output 532.

The output bias voltage 530 is received by gate drive circuit 506, which also receives gate control signal 534. Gate control signal 534 is output from control circuit 510 and controls the on/off state of gate drive output 420. Gate control signal 534 can cause gate drive output 420 to be off, which turns off power transistor 510, or gate control signal 534 can cause gate drive output 420 to be on, which allows gate drive circuit 506 to control power transistor 510. Capacitor 432 is connected to gate drive circuit 506 and sets the inrush current limit value during turn on of power transistor 501. Preferably, capacitor 432 has a value of 18 nano-farads, which provides an inrush current limit of approximately 7.5 mili-amps per microsecond. Capacitor 432 is referenced to the switch output 532.

Output bias voltage 530 is also received by sense amplifier and current telemetry circuit 520, which senses the current flow through the switch by amplifying the voltage drop across sense resistor 422. Circuit 520 outputs current telemetry signal 534, which indicates the current flow through the switch. Circuit 520 also outputs a signal 536, which is proportional to the current flow through the switch. Signal 536 is received by current limit and high-speed current limit circuit 512. Circuit 512 limits the current through the switch by controlling signal 538, which is received by gate drive circuit 506. Circuit 506 varies the current through transistor 510 depending upon signal 538.

Signal 536 is also received by overload timer circuit 518, which compares voltage 536 with the voltage output from voltage reference circuit 516 and determines whether an overload condition exists. If an overload condition exists, then the overload trip delay timer is started. The delay time is set by selection of the value of capacitor 436. If the overload condition still exists at the expiration of the overload timer, then overload timer circuit 518 outputs a signal 540, which is received by control circuit 510 and by overload latch 514. Upon receipt of signal 540, control circuit 510 outputs a signal 532 to gate drive circuit 506, causing turn off of power transistor 501. Overload latch 514 latches signal 540 and outputs overload indicator signals 544 and 546.

Voltage telemetry circuit 508 measures the voltage output from the switch and outputs voltage telemetry signal 548, which indicates the measured voltage. High-speed current limit disable signal 550 is input to control circuit 510 and allows the high-speed current limit function to be disabled.

Zener diode 552 is connected to gate drive output 420 of gate drive circuit 506 and limits the voltage applied to the gate of power transistor 501.

Figure 6:
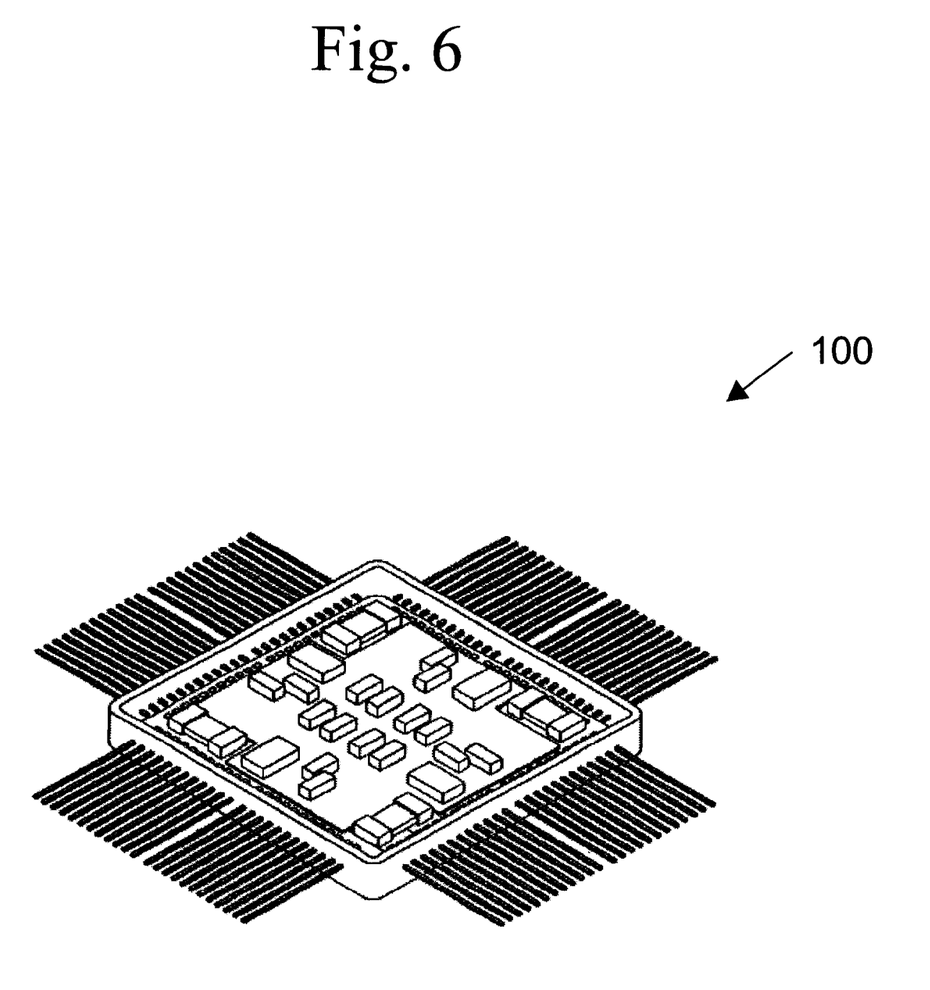
FIG. 6 is a view of a packaged power actuation and switching module.
Figure 7:
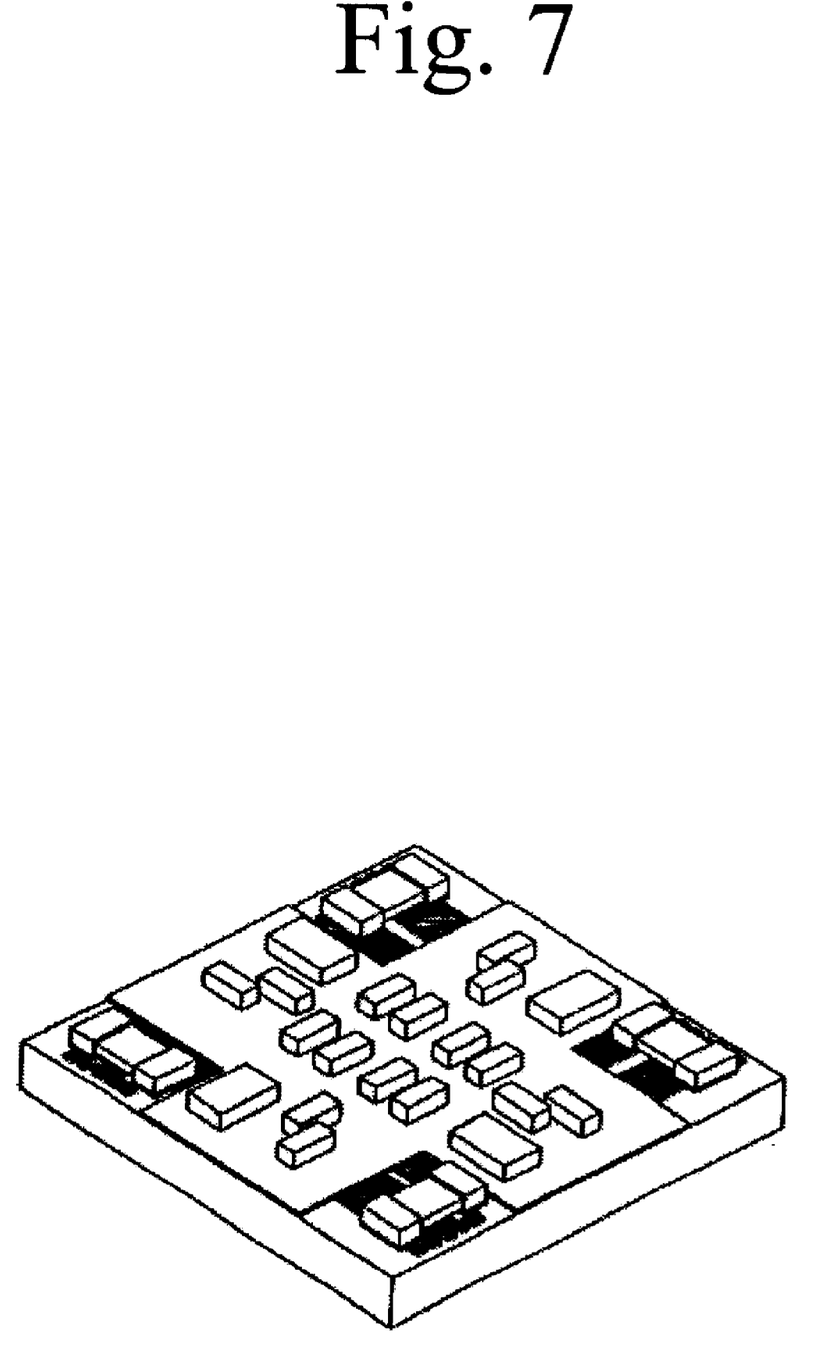
FIG. 7 is a view of an unpackaged power actuation and switching module.
Figure 8:
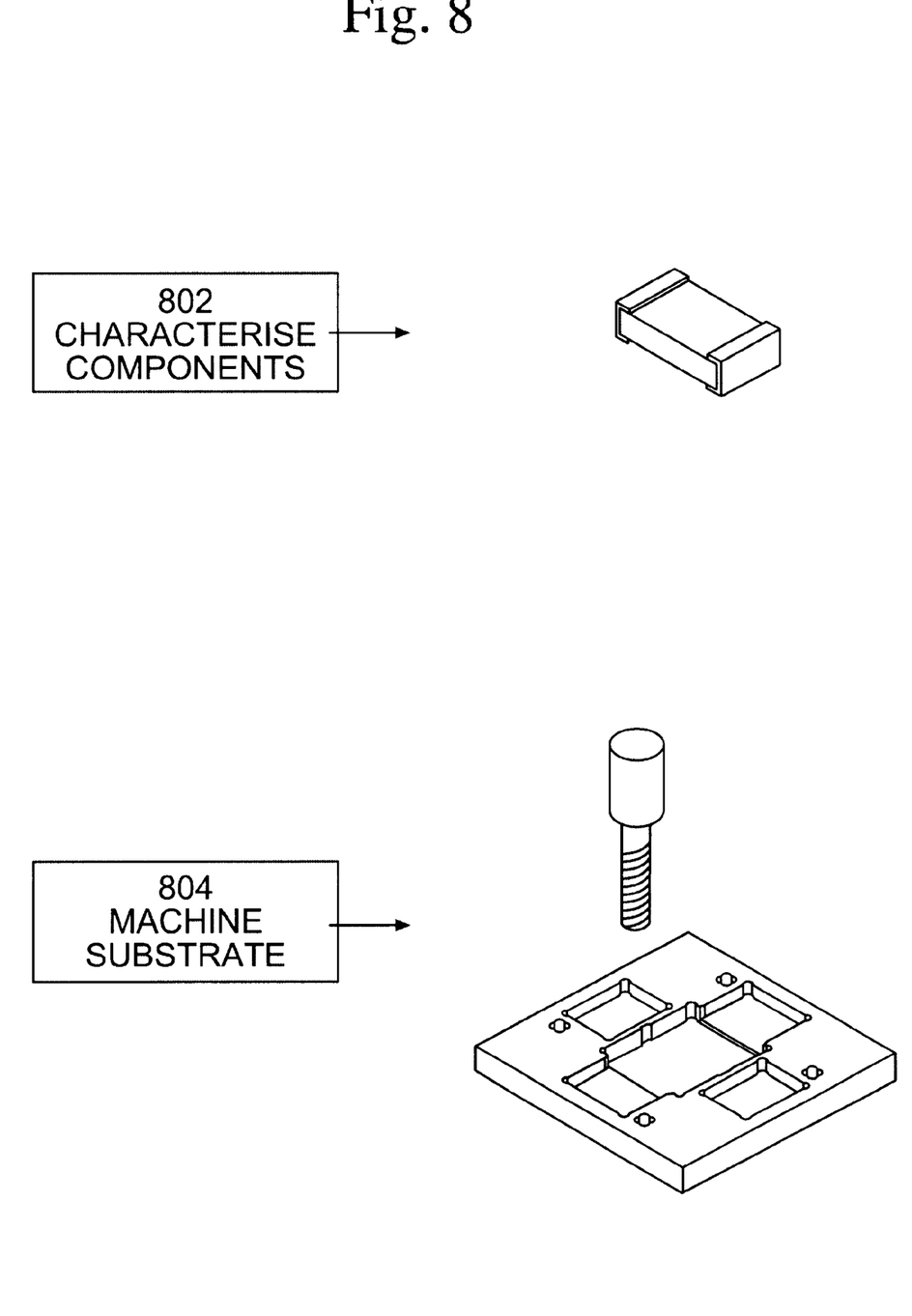
FIG. 8 is a process diagram of steps of a high density interconnect process used to package the power actuation and switching module of the present invention.

A packaged power actuation and switching module 600 is shown in FIG. 6, while the unpackaged circuitry of the module is shown in FIG. 7. Preferably, module 600 is fabricated using a high density interconnect (HDI) packaging technology, which involves fabrication of a KAPTON™ (polymide) based multilayer interconnect structure. The KAPTON™ is laminated one layer at a time to the top surface of bare die, packaged parts and other active and passive components. Components may be mounted to the topmost layer of HDI interconnect using standard surface mount techniques.

The HDI process is shown in FIGS. 8–11. In step 802, shown in FIG. 8, components used in HDI are characterized, which is the physical measurement of components and the mapping of component input/output locations for use during the generation of pads and traces. In step 804, pockets to accept the parts are machined into an alumina ceramic substrate. The pockets are sized to ensure that the topmost surface of the part mounted in the pocket is flush with the top surface of the substrate.

Figure 9:
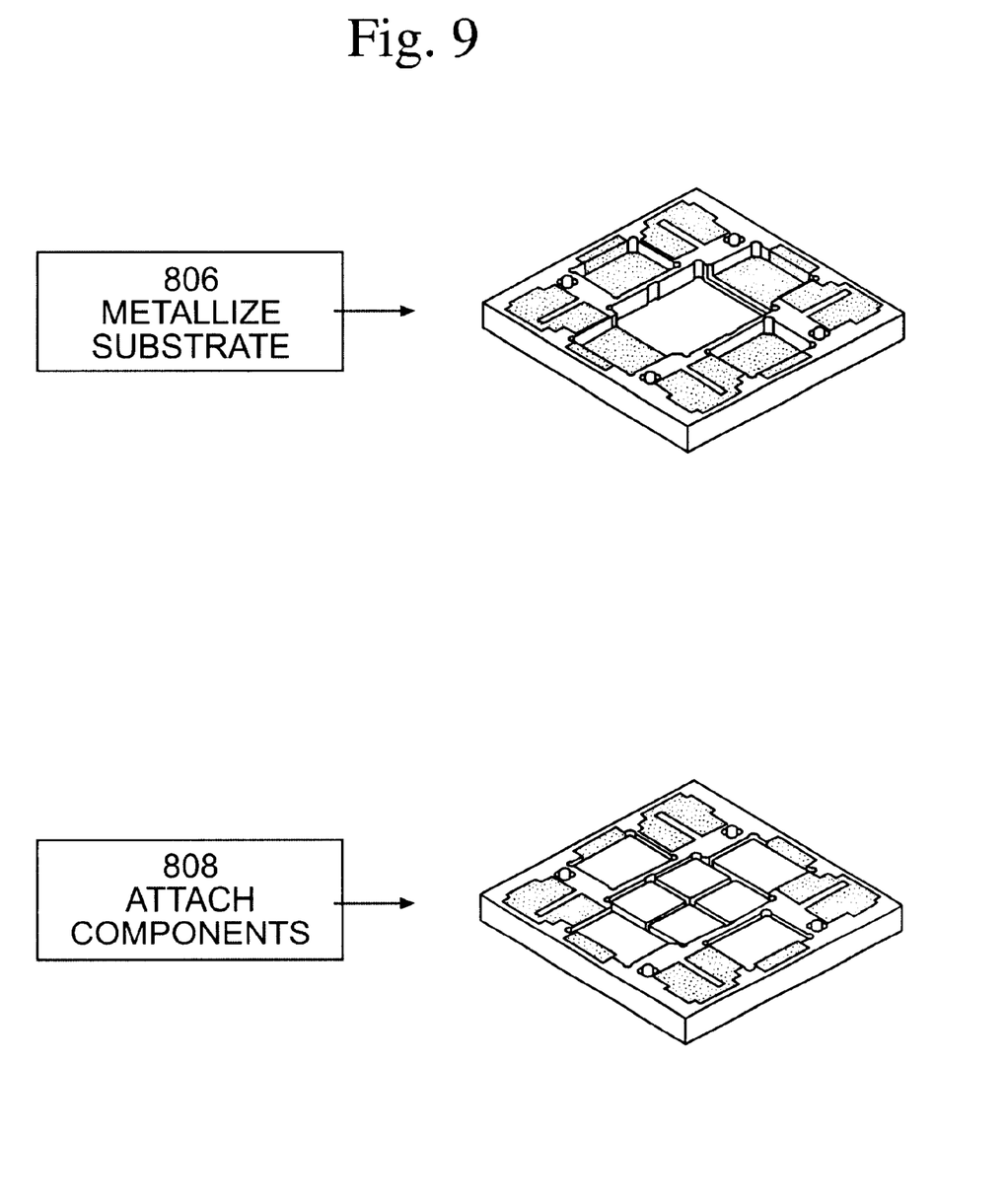
FIG. 9 is a process diagram of steps of a high density interconnect process used to package the power actuation and switching module of the present invention.

In step 806, shown in FIG. 9, a metallized pattern is laid down on the substrate by sputter deposition, photo lithography and etching to form the required elements prior to component placement. In step 808, the components are attached to the substrate using thermoplastic resin, thermosetting epoxies and high temperature solders.

Figure 10:
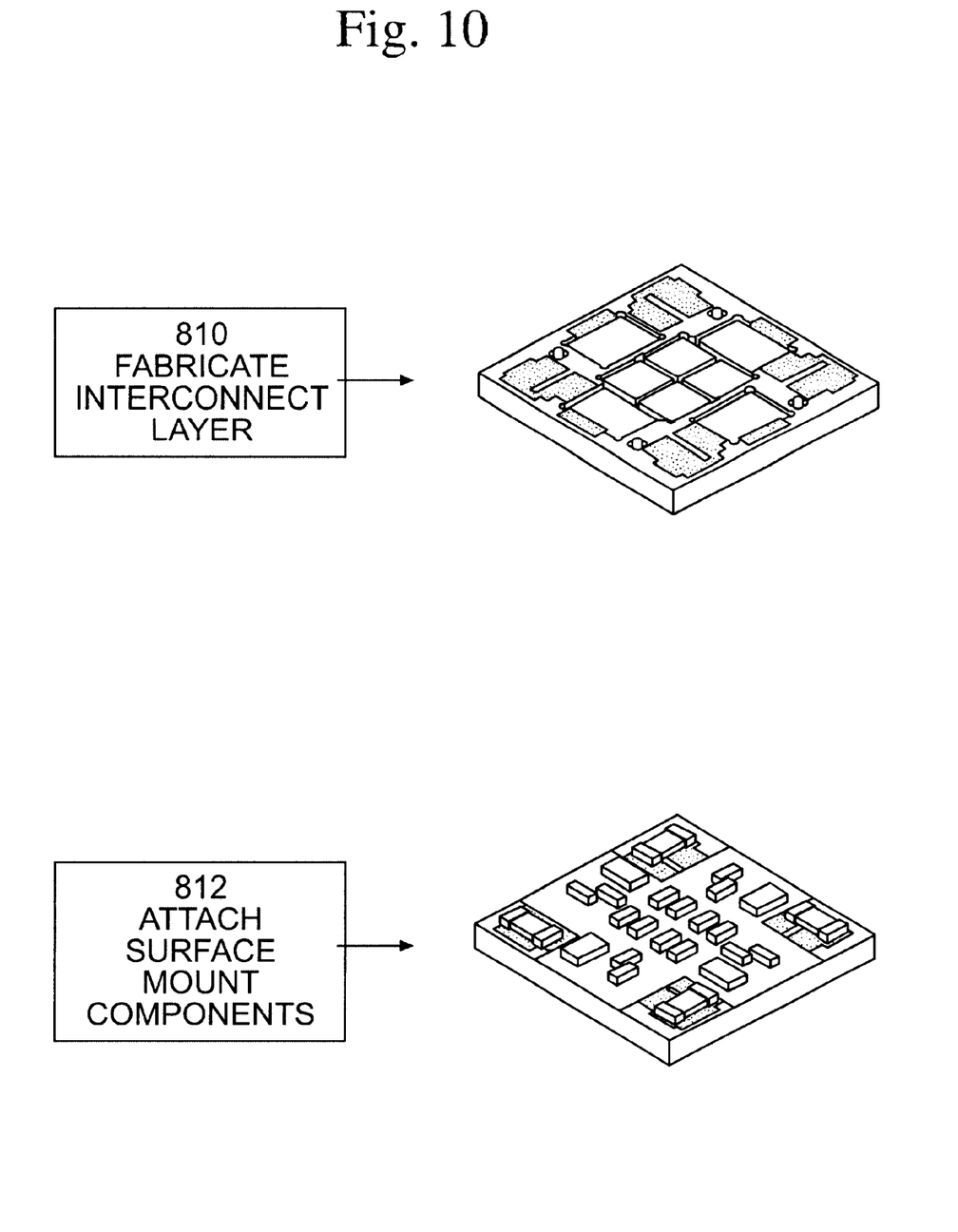
FIG. 10 is a process diagram of steps of a high density interconnect process used to package the power actuation and switching module of the present invention.

In step 810, shown in FIG. 10, the interconnect layer is fabricated upon the populated substrate. Using a combination of vacuum, heat, and pressure, a KAPTON™ film is laminated onto the populated substrate using thermoplastic adhesive. The integrated circuit bond pads are located using an image processing system. A direct write laser is used to form vias through the KAPTON™ to the integrated circuit bond pads and to input/output pads on the substrate metallization. The first interconnect layer is formed by sputtering films of titanium, copper and titanium. The metals are patterned by exposing a negative photo-resist with a direct write computer-controlled laser. The metal is then chemically etched leaving the desired circuit pattern. Subsequent layers are formed by laminating additional layers of KAPTON™ onto the substrate using a thermosetting adhesive and repeating the laser drill, pattern and etch steps. In step 812, surface mount components are then attached to the top lamination layer.

Figure 11:
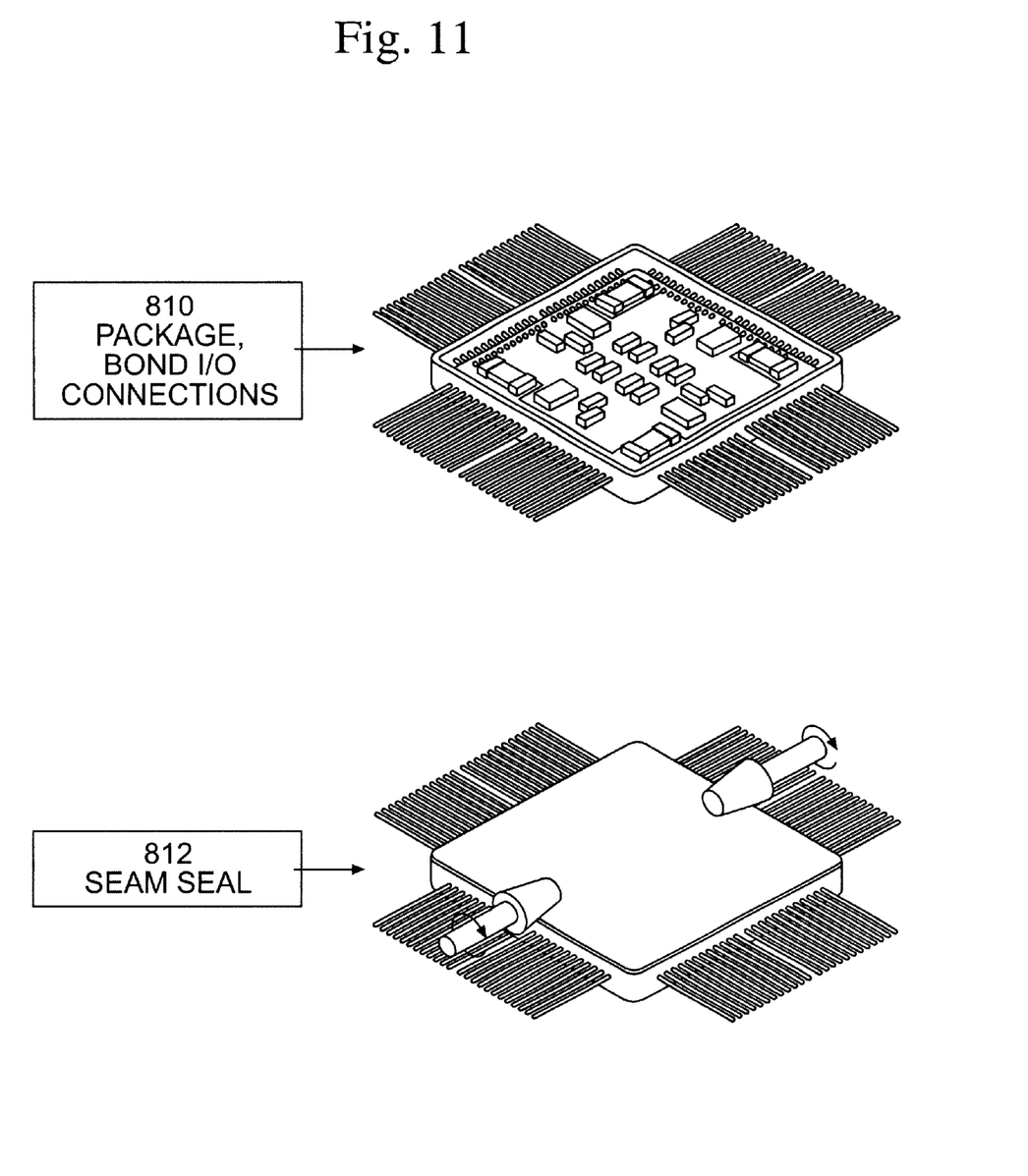
FIG. 11 is a process diagram of steps of a high density interconnect process used to package the power actuation and switching module of the present invention.

In step 814, shown in FIG. 11, the completed circuitry module is epoxy bonded into a standard KOVAR™ package and the input/output connections are wire bonded. In step 816, the package is seam sealed, completing the module assembly.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A power switching apparatus comprising:
   a plurality of power switching circuits, each power switching circuit comprising:
   a switched power input and a switched power output;
   a switching device coupling the switched power input to the switched power output, the switching device having a control input; and
   a control circuit coupled to the switching device control input, having a control input, an input for sensing current flow through the switching device, and an input for sensing voltage at the switched power output, the control circuit comprising a circuit, responsive to the control input, operable to turn on the switching device, a circuit, responsive to the current sensing input, operable to limit current flow through the switching device, a circuit, responsive to the voltage sensing input, operable to turn off the switching device, the control circuit operable to control the switching device based on the control input, current sensing input and voltage sensing input.

2. The apparatus of claim 1, wherein the switched power output is coupled to a load and the circuit operable to turn on the switching device comprises a circuit operable to limit inrush current to the load during turn on of the switching device.

3. The apparatus of claim 2, wherein the circuit operable to turn off the switching device comprises a circuit operable to delay turn off of the switching device.

4. The apparatus of claim 3, wherein the circuit operable to turn off the switching device further comprises a circuit operable to control a rate of turn off of the switching device.

5. The apparatus of claim 4, wherein the circuit operable to limit current flow through the switching device is further operable to:
   limit current flow through the switching device with a first speed, when a current flow through the switching device reaches a first level; and
   limit current flow through the switching device with a second speed, when the current flow through the switching device reaches a second level;
   wherein the second speed is higher than the first speed and the second level is higher than the first level.

6. A power switching apparatus comprising:
   a plurality of power switching circuits, each power switching circuit comprising:
   a switched power input and a switched power output;
   a switching device coupling the switched power input to the switched power output, the switching device having a control input; and
   an integrated circuit coupled to the switching device control input, having an enable input receiving a signal indicating whether the switching device is to be on or off, an input sensing current flow through the switching device, and an input sensing voltage at the switched power output, the circuit operable to control the switching device based on the control input, current sensing input and voltage sensing input, wherein the integrated circuit comprises:
   a power on circuit, responsive to the enable input receiving a signal indicating that the switching device is to be on, operable to transmit an enable signal;
   a sense amplifier circuit, coupled to the current sense input, operable to output a signal indicating current flow through the switching device;
   an overload circuit, coupled to the current flow indicating signal, operable to output an overload signal indicating that the current flow through the switching device has exceeded a predetermined limit;
   a current limit circuit, coupled to the current flow indicating signal operable to output a gate drive current limit signal;
   a control circuit, responsive to the enable signal and the overload signal operable to transmit a charge pump bias signal and a gate drive control signal;
   a charge pump circuit, responsive to the charge pump bias signal, operable to output a gate drive bias signal; and
   a gate drive circuit, responsive to the gate drive bias signal, the gate drive control signal, and the gate drive current limit signal, operable to output a switching device control signal coupled to the switching device control input.

7. The power switching apparatus of claim 6, wherein the overload circuit comprises a timer circuit operable to delay output of the overload signal.

8. The power switching apparatus of claim 7, wherein the gate drive circuit comprises a circuit operable to limit an inrush current through the switching device during turn on.

9. The power switching apparatus of claim 8, wherein the power on circuit is further responsive to the enable input receiving a signal that the switching device is to be off and is further operable to transmit a disable signal.

10. The power switching apparatus of claim 9, wherein the power on circuit further comprises a circuit operable to delay output of the disable signal after receiving the signal that the switching device is to be off.

11. The power switching apparatus of claim 10, wherein the integrated circuit further comprises a voltage telemetry circuit coupled to the input sensing voltage at the switched power output and outputting a signal indicating the sensed voltage on an output of the integrated circuit.

12. The power switching apparatus of claim 11, wherein the sense amplifier circuit further outputs a signal indicating the sensed current flow on an output of the integrated circuit.

13. The power switching apparatus of claim 12, wherein the switching device is a power field-effect transistor.

14. The apparatus of claim 13, wherein the current limit circuit is operable to:
   output a first gate drive current limit signal with a first speed in response to the current flow indicating signal indicating a first current flow through the switching device; and
   output a second gate drive current limit signal with a second speed in response to the current flow indicating signal indicating a second current flow through the switching device;
   wherein the second speed is higher than the first speed and the second current flow is higher than the first current flow.

15. The power switching apparatus of claim 13, wherein the overload circuit timer circuit comprises a circuit operable to set a delay time of the output of the overload signal.

16. The power switching apparatus of claim 15, wherein the circuit operable to set a delay time of the output of the overload signal comprises a capacitor external to the integrated circuit.

17. The power switching apparatus of claim 13, wherein the gate drive circuit inrush current limit circuit comprises a circuit operable to set the inrush current through the switching device.

18. The power switching apparatus of claim 17, wherein the circuit operable to set the inrush current through the switching device comprises a capacitor external to the integrated circuit.

19. The power switching apparatus of claim 13, wherein the power on circuit disable output delay circuit comprises a circuit operable to set a delay time of the output of the disable signal.

20. The power switching apparatus of claim 19, wherein the circuit operable to set a delay time of the output of the disable signal comprises a capacitor external to the integrated circuit.

21. A power switching apparatus comprising:
   a plurality of power switching circuits, each power switching circuit comprising:
      a switched power input and a switched power output;
      a switching device coupling the switched power input to the switched power output, the switching device having a control input; and
      means for controlling the switching device, coupled to the switching device control input, having an enable input receiving a signal indicating whether the switching device is to be on or off, an input sensing current flow through the switching device, and an input sensing voltage at the switched power output, the circuit operable to control the switching device based on the control input, current sensing input and voltage sensing input, wherein the means for controlling the switching device comprises:
         means, responsive to the enable input receiving a signal indicating that the switching device is to be on, for transmitting an enable signal;
         means, coupled to the current sense input, for outputting a signal indicating current flow through the switching device;
         means, coupled to the current flow indicating signal, for outputting an overload signal indicating that the current flow through the switching device has exceeded a predetermined limit:
         means, coupled to the current flow indicating signal, for outputting a gate drive current limit signal;
         means, responsive to the enable signal and the overload signal, for transmitting a charge pump bias signal and a gate drive control signal;
         means, responsive to the charge pump bias signal, for outputting a gate drive bias signal; and
         means, responsive to the gate drive bias signal, the gate drive control signal, and the gate drive current limit signal, for outputting a switching device control signal coupled to the switching device control input.

22. The power switching apparatus of claim 21, wherein the means for outputting an overload signal comprises means for delaying output of the overload signal.

23. The power switching apparatus of claim 22, wherein the means for outputting a switching device control signal comprises means for limiting an inrush current through the switching device during turn on.

24. The power switching apparatus of claim 23, wherein the integrated circuit further comprises means, responsive to the enable input receiving a signal indicating that the switching device is to be off, for transmitting a disable signal.

25. The power switching apparatus of claim 24, wherein the means for transmitting a disable signal further comprises a means for delaying output of the disable signal after receiving the signal that the switching device is to be off.

26. The power switching apparatus of claim 25, wherein the integrated circuit further comprises means, coupled to the input sensing voltage at the switched power output, for outputting a signal indicating the sensed voltage on an output of the integrated circuit.

27. The power switching apparatus of claim 26, wherein the means for outputting a signal indicating current flow through the switching device further outputs a signal indicating the sensed current flow on an output of the integrated circuit.

28. The power switching apparatus of claim 27, wherein the switching device is a power field-effect transistor.

29. The apparatus of claim 28, wherein the means, for outputting a gate drive current limit signal further comprises:
   means for outputting a first gate drive current limit signal with a first speed in response to the current flow indicating signal indicating a first current flow through the switching device; and
   means for outputting a second gate drive current limit signal with a second speed in response to the current flow indicating signal indicating a second current flow through the switching device;
   wherein the second speed is higher than the first speed and the second current flow is higher than the first current flow.

30. The power switching apparatus of claim 28, wherein the overload indicating means delaying means comprises means for setting a delay time of the output of the overload signal.

31. The power switching apparatus of claim 30, wherein the means for setting a delay time of the output of the overload signal comprises a capacitor external to the integrated circuit.

32. The power switching apparatus of claim 28, wherein the means for limiting an inrush current through the switching device during turn on comprises means for setting the inrush current through the switching device.

33. The power switching apparatus of claim 32, wherein the means for setting the inrush current through the switching device comprises a capacitor external to the integrated circuit.

34. The power switching apparatus of claim 29, wherein the means for delaying output of the disable signal comprises means for setting a delay time of the output of the disable signal.

35. The power switching apparatus of claim 34, wherein the means for setting a delay time of the output of the disable signal comprises a capacitor external to the integrated circuit.

* * * * *